US010248311B2

(12) United States Patent
Pingco et al.

(10) Patent No.: US 10,248,311 B2
(45) Date of Patent: Apr. 2, 2019

(54) ELECTRONIC DEVICE SUPPORTING VIRTUAL KEYBOARD AND METHOD FOR CONFIGURING THE VIRTUAL KEYBOARD

(71) Applicant: Samsung Electronics Co., Ltd., Suwon-si, Gyeonggi-do (KR)

(72) Inventors: John Nikole Miranda Pingco, Taguig (PH); Danilo Jr Pilar Ocray, Taguig (PH); Roland Joseph M. Gudani, Taguig (PH); Ronald Phillip C. Cui, Taguig (PH)

(73) Assignee: Samsung Electronics Co., Ltd., Suwon-si (KR)

( * ) Notice: Subject to any disclaimer, the term of this patent is extended or adjusted under 35 U.S.C. 154(b) by 261 days.

(21) Appl. No.: 15/133,564

(22) Filed: Apr. 20, 2016

(65) Prior Publication Data

US 2017/0010806 A1    Jan. 12, 2017

(30) Foreign Application Priority Data

Jul. 6, 2015  (PH) .......................... 1-2015-000236
Nov. 10, 2015  (KR) ........................ 10-2015-0157773

(51) Int. Cl.
*G06F 3/0488*    (2013.01)
(52) U.S. Cl.
CPC ...... *G06F 3/04886* (2013.01); *G06F 3/04883* (2013.01)
(58) Field of Classification Search
CPC combination set(s) only.
See application file for complete search history.

(56) References Cited

U.S. PATENT DOCUMENTS

| 2009/0146957 A1* | 6/2009 | Lee ...................... G06F 3/0418 |
| | | 345/168 |
| 2010/0241985 A1 | 9/2010 | Kim et al. | |
| 2012/0206363 A1* | 8/2012 | Kyprianou ......... G06F 3/04883 |
| | | 345/168 |
| 2012/0287135 A1* | 11/2012 | Pfeifle .................. G06T 11/203 |
| | | 345/442 |
| 2013/0307801 A1 | 11/2013 | Nam | |
| 2014/0058935 A1 | 2/2014 | Mijares | |
| 2014/0082546 A1* | 3/2014 | Yang .................. G06F 3/04886 |
| | | 715/773 |

(Continued)

FOREIGN PATENT DOCUMENTS

EP    2 450 783 A1    5/2012
JP    2014-023080 A    2/2014

*Primary Examiner* — Steven P Sax
*Assistant Examiner* — Wendy Nicholas
(74) *Attorney, Agent, or Firm* — Jefferson IP Law, LLP

(57) ABSTRACT

An electronic device for supporting a virtual keyboard is provided. The electronic device includes an interface unit configured to receive a touch input and display the virtual keyboard, and a controller configured to generate a control point based on calibration points, the calibration points being included in a first set of calibration points for configuration of the virtual keyboard, the control point being movably disposed on the interface unit relative to the first set of calibration points, and generate a graphical representation of the virtual keyboard on the interface unit based on the control point, the virtual keyboard being adjustable relative to movement of the control point in a direction of the second set of calibration points.

15 Claims, 13 Drawing Sheets

(56) References Cited

U.S. PATENT DOCUMENTS

| | | | |
|---|---|---|---|
| 2014/0143728 A1 | 5/2014 | Coleman, Jr. et al. | |
| 2015/0026624 A1* | 1/2015 | Hui | G06F 3/04886 715/773 |
| 2015/0128081 A1* | 5/2015 | Hsieh | G06F 3/04886 715/773 |
| 2015/0205507 A1* | 7/2015 | Chen | G06F 3/048 715/800 |
| 2015/0301713 A1* | 10/2015 | Suda | G06F 3/0487 715/762 |
| 2016/0062644 A1* | 3/2016 | Adams | G06F 3/04886 715/763 |
| 2016/0098188 A1* | 4/2016 | Chin | G06F 3/04886 345/173 |

* cited by examiner

ELECTRONIC DEVICE SUPPORTING VIRTUAL KEYBOARD AND METHOD FOR CONFIGURING THE VIRTUAL KEYBOARD

CROSS-REFERENCE TO RELATED APPLICATION(S)

This application claims the benefit under 35 U.S.C. § 119(a) of a Philippine patent application filed on Jul. 6, 2015 in the Intellectual Property Office of the Philippines and assigned Serial number 1-2015-000236, and of a Korean patent application filed on Nov. 10, 2015 in the Korean Intellectual Property Office and assigned Serial number 10-2015-0157773, the entire disclosure of each of which is hereby incorporated by reference.

TECHNICAL FIELD

The present disclosure relates to an electronic device for providing a soft or virtual keyboard. More particularly, the present disclosure relates to an electronic device for providing a keyboard of calibrated configuration which supports natural and comfortable movement of a human thumb.

BACKGROUND

Demands for terminals having large-sized touch screens are increasing to meet the needs of users. A variety of types of terminals with touch screens, such as smart phones, tablet personal computers (PCs), phablets, etc., are being released. However, as the size of the terminals becomes larger, it becomes more difficult for the user to manipulate the terminal with a single hand. For this reason, various types of soft or virtual keyboards (hereinafter, called 'virtual keyboards') are being studied for the terminals that support one-handed manipulation.

European (EU) Patent Publication No. 2450783 published on May 9, 2012 to Intel Corporation describes a configuration of a virtual keyboard for handheld devices wherein virtual keys may be arranged in arcs that are conveniently reached by a user's thumb when the handheld device is held in the user's hand, wherein the placement of the keys may be customized to fit the individual user's thumb or personal preferences.

European Patent Publication No. 2450783 describes an arc-shaped virtual keyboard is provided by first prompting the user to draw an arc with his thumb on the touch screen surface and then, if the arc is drawn by the user, recording the location of the arc on the screen display. The location of the arc may be used to determine where a row of keys of the virtual keyboard will be placed on the display screen. If more than one row is to be placed on the display screen, the user may be prompted to draw a middle arc, an outer arc, and an inner arc. Each of the arcs is referred to as a "calibration arc" because its purpose is to calibrate the location of the row of keys so the keys on the row will be at a convenient position for the user's thumb.

The user may be prompted to retrace each arc more than once so that the handheld device can determine an average position of the arc. The keys rendered based on the drawn arc support one-hand operation.

In the above prior art documents, there may be an uncomfortable reach of a thumb or other gestures when the curve of an arc is drawn on the touch screen. The user has to repeatedly perform the drawing of the curve until he feels comfortable in manipulating the virtual keyboard generated based on the curve drawn on the touch screen. Moreover, the repetitive arc calibration may require considerable time and may also bring about a keyboard configuration that does not fit the natural movement of the user's thumb.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and method for efficiently configuring a virtual keyboard without need for repetitive calibration in the electronic device that supports the virtual keyboard. Such an electronic device and method may eliminate the inconvenience of repetitive arc calibration in configuring the virtual keyboard for single handed operation.

In accordance with an aspect of the present disclosure, an electronic device for supporting a virtual keyboard is provided. The electronic device includes an interface unit configured to receive a touch input and display the virtual keyboard, and a controller configured to generate a control point based on calibration points, the calibration points being included in a first set of calibration points for configuration of the virtual keyboard, the control point being movably disposed on the interface unit relative to the first set of calibration points, and generate a graphical representation of the virtual keyboard on the interface unit based on the control point, the virtual keyboard being adjustable relative to movement of the control point in a direction of the second set of calibration points.

The electronic device may have a storage unit for storing data and program codes.

The electronic device may provide an interface unit for receiving input data to be stored in the storage unit and outputting output data from the storage unit.

The interface unit may have a first set of calibration regions within which first and second sets of calibration points corresponding to the input data may be inputted.

The interface unit may have a second set of calibration regions within which third and fourth sets of calibration points corresponding to the input data may be inputted.

The first set of calibration points may include a first calibration point that may represent a comfortable vertical range of the user's thumb in relation to the interface unit, and a second calibration point that may represent a comfortable horizontal range of the user's thumb in relation to the interface unit.

The second set of calibration points may include third and fourth calibration points that may represent comfortable gestures, such as click, long click, press, and swipe of the user's thumb in relation to the interface unit.

The program codes may basically include machine-executable instructions, when accessed and executed by a processing unit from the storage unit, carrying out operations of: generating an indication of relationships of the first and second calibration points to one another on the interface unit, and generating a graphical representation of a keyboard and corresponding output data on the interface unit.

The relationship of the first and second calibration points may be determined by an intersection point of a horizontal line derived from the first calibration point and a vertical line derived from the second calibration point.

The indication of the relationship in relation to the intersection point may be defined by an initial curve.

The initial curve may be a Bezier curve, and more specifically, a cubic Bezier curve.

The indication may provide two control points that may be movably disposed on the interface unit relative to the first set of calibration points.

Configuration of the keyboard may be based on the disposition of the two control points.

Since the control points are movable, configuration of a keyboard region may be adjusted relative to movement of the control points in a direction of the second set of calibration points including the third and fourth calibration points.

Configuration of the keyboard region adjusted based on the movement of the control points may be defined by a final curve, which may be a cubic Bezier curve.

Adjustable configuration of the keyboard region based on the second set of calibration points indicative of a comfortable gesture of the user's thumb in relation to the interface unit may be provided to ensure that the user may conveniently input text on the interface unit only with his/her one hand.

Calibrated keyboard configuration may support natural curved movement of the human thumb, a region within reach of the thumb, contact size on the touch screen, and comfortable gestures.

Respective sizes of keyboard buttons may be arranged to fit users with large thumb contact sizes and mobile devices with small-sized touch screens designed for input accuracy.

Providing the control points which may be adjusted by the user in the direction of the second set of calibration points indicative of a comfortable gesture of the user's thumb on the interface unit may ensure that the user making the calibration of the configuration of the keyboard is enabled to accurately and indefinitely configure (or reconfigure) the keyboard region in one calibration sequence without having to repeat inputting calibration points which define the comfortable reach and other gestures, or natural movement, of his/her thumb.

In accordance with another aspect of the present disclosure, a machine-implemented method of controlling an electronic device having an interface unit is provided. The machine-implemented method includes generating a first set of calibration regions on the interface unit and receiving a first set of calibration points within the first set of calibration regions.

The machine-implemented method also includes displaying a control point of at least one relationship of the first set of calibration points, receiving an input for moving a position of the control point, and generating on the interface unit a second set of calibration regions based on the position of the control point.

Once the second set of calibration regions has been generated, a second set of calibration points within the second set of calibration regions is received and a graphical representation of the keyboard of a specified configuration based on disposition of the control point is generated, wherein the configuration of the keyboard region is adjustable relative to the movement of the control point in the direction of the second set of calibration points.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following embodiments of the present disclosure, devices such as terminals having a touch screen and supporting a virtual keyboard that may be manipulated with one hand of the user through a screen display of the touch screen will be commonly called electronic devices.

Figure 1:
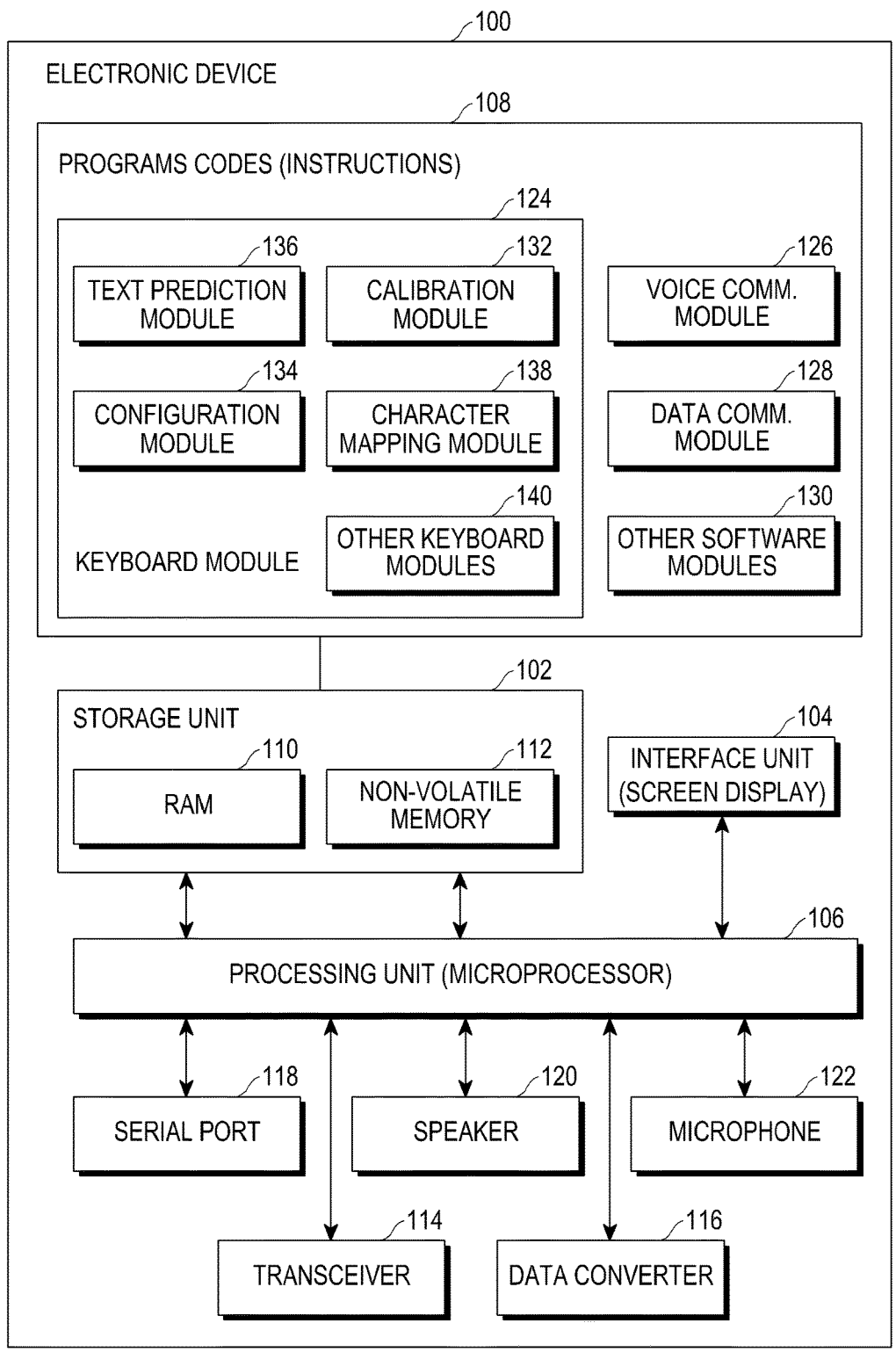
FIG. 1 is a block diagram of an electronic device for providing a calibrated keyboard according to an embodiment of the present disclosure.

FIG. 1 is a block diagram of an electronic device for providing a calibrated keyboard according to an embodiment of the present disclosure.

Referring to FIG. 1, the electronic device 100 includes a storage unit 102, an interface unit 104, and a processing unit 106.

The storage unit 102 stores various data associated with the electronic device 100. The storage unit 102 includes program codes having machine-executable instructions 108 that may be executed by the processing unit 106 to perform operations related to the virtual keyboard in accordance with various embodiments of the present disclosure. The instructions 108 may be implemented to have at least one of a plurality of software modules that may carry out a basic communication function and a plurality of functions related to the virtual keyboard. For example, the instructions 108 include a keyboard module 124, a voice communications module 126, a data communications module 128, and other software modules 130. The keyboard module 124 may include a calibration module 132, a configuration module 134, a text prediction module 136, a character mapping module 138, and other keyboard modules 140. The storage unit 102 may include a random access memory (RAM) 110 and a non-volatile memory 112. The plurality of software modules may be stored in the non-volatile memory 112. The non-volatile memory 112 may use a flash memory unit, a battery back-up static RAM (SRAM) unit, or the like.

In FIG. 1, the interface unit 104 may be arranged and operable to permit a user to interact with at least one of the software modules 126 to 140 loaded into the non-volatile memory 112 and generally executed by the processing unit 106 from the storage unit 102. For example, the interface unit 104 may respond to at least one event that may be detected by the at least one of the software modules 126 to 140 while being executed by the processing unit 106, and corresponding objects to the response may be graphically rendered on a screen display of the interface unit 104. The interface unit 104 serves as a graphical user interface (GUI) capable of receiving input data from the user and outputting data through a display.

The processing unit 106 controls the operations and functions that may be performed by the electronic device 100. The processing unit 106 accesses and executes the instructions 108 included in the program codes. The processing unit 106 may be implemented by a microprocessor that carries out various instructions associated with the software modules 126 to 140 or computer programs by performing mathematical operations, logical operations, and input/output operations. The processing unit 106 may also include an arithmetic logic unit (not shown) for performing mathematical and logical operations, and a control unit (not shown) for fetching the instructions 108 from the storage unit 102 and then interpreting and executing the instructions 108.

The processing unit 106 may interact with subsystems included in the electronic device 100. The subsystems may include e.g., a transceiver 114 for providing signal transmission and receptions functions, a data converter 116 for converting data stored in the storage unit 102 from one format to another such as from analog to digital, a serial port 118 for providing communication and information exchange with an external device, a speaker 120 for processing voice signal output, and a microphone 122 for processing voice signal input.

In FIG. 1, the software modules 126 to 140 may be grouped by functions. For example, the software modules 126 to 140 include a keyboard module 124, a voice communication module 126, and a data communication module 128. Other software modules 130 may likewise be included in the storage unit 102.

The keyboard module 124 includes at least one of a calibration module 132, a configuration module 134, a text prediction module 136, and a character mapping module 138, which are associated with configuration of the virtual keyboard. Other keyboard modules 140 may likewise be included in the keyboard module 124 stored in the storage unit 102.

The calibration module 132 may perform calibration operations for configuring the virtual keyboard in accordance with embodiments of the present disclosure. The configuration module 134 performs operations related to laying out keyboard buttons and keyboard regions according to calibrated ergonomic comfort zones in the keyboard configuration. The text prediction module 136 performs operations related to suggesting and predicting text to be entered by the user on the keyboard region of the virtual keyboard. The character mapping module 138 performs operations related to mapping specific characters and functions to buttons on the virtual keyboard. The character mapping module 138 also handles input gestures such as, by way of example, click, long click, and press and swipe. The character mapping module 138 may further be arranged to determine what specific type of action is performed for the virtual keyboard of the electronic device 100 depending on the gesture made by the user.

The software modules 126 to 140 for providing a calibrated keyboard configuration in accordance with various embodiments of the present disclosure may or may not correspond to discrete blocks of the program codes 108. In this regard, the functions as described for each of the software modules 126 to 140 may be implemented by executing various program codes stored in the non-volatile memory 112 at predetermined time intervals.

The program codes stored in the non-volatile memory 112 may be performed on appropriate computing resources, and the configuration of the software modules 126 to 140 is merely an example of providing calibrated keyboard configuration for the virtual keyboard, but may be modified in various forms that may perform the following embodiments of the present disclosure.

Furthermore, the calibration module 132 may be configured to communicate with the interface unit 104 through the processing unit 106. The interface unit 104 is configured to receive input data, which may be stored in the storage unit 102, and output data from the storage unit 102. The interface unit 104 has a set of calibration regions within which first and second sets of calibration points corresponding to the input data, which will be described later with reference to FIG. 3, may be inputted.

The calibration points define a comfortable reach and other gestures, or natural movements, of the user's thumb, for the user who is calibrating the virtual keyboard configuration.

When the instructions 108 included in the program codes are accessed and executed by the processing unit 106 in FIG. 1, the processing unit 106 performs the following operations of:

(1) indicating a relationship of calibration points included in the first set to one another, the indication having a control point movably disposed on the screen display of the interface unit 104 relative to the first set of calibration points; and (2) indicating a graphical representation of a virtual keyboard corresponding to the output data based on disposition of the control point, the configuration of the keyboard region in the virtual keyboard being adjustable relative to the movement of the control point in the direction of the second set of calibration points.

Prior to describing details of various embodiments of the present disclosure, the term "configuration" may be understood as referring to physical characteristics of the keyboard region such as shape or form, dimension or size, and area or region, and arrangement of keys of the virtual keyboard. Furthermore, two or more relationships of the calibration points included in the first set of calibration points, and two or more controls points may be suitably arranged in the electronic device 100 providing the calibrated keyboard configuration in accordance with an embodiment of the present disclosure. The control point may be adjusted by the user in the direction of the second set of calibration points indicative of a comfortable gesture of the user's thumb may ensure that the user who is calibrating keyboard can configure (or reconfigure) the keyboard region in one calibration sequence without having to repeat inputting calibration points which define the comfortable reach and other gestures, or natural movement, of the user's thumb.

Furthermore, the keyboard configuration in accordance with various embodiments of the present disclosure may include three user interface sections, a text prediction section, an alphabet section, and a function button section.

The alphabet section may be modified to support language that corresponds to a language setting of the keyboard.

A virtual keyboard configuration method in accordance with various embodiments of the present disclosure may be applicable to relatively large sized electronic devices (e.g., a screen of 5 inches) as well as various electronic devices that may be manipulated with one hand and may use a touch screen in various sizes.

Figure 2:
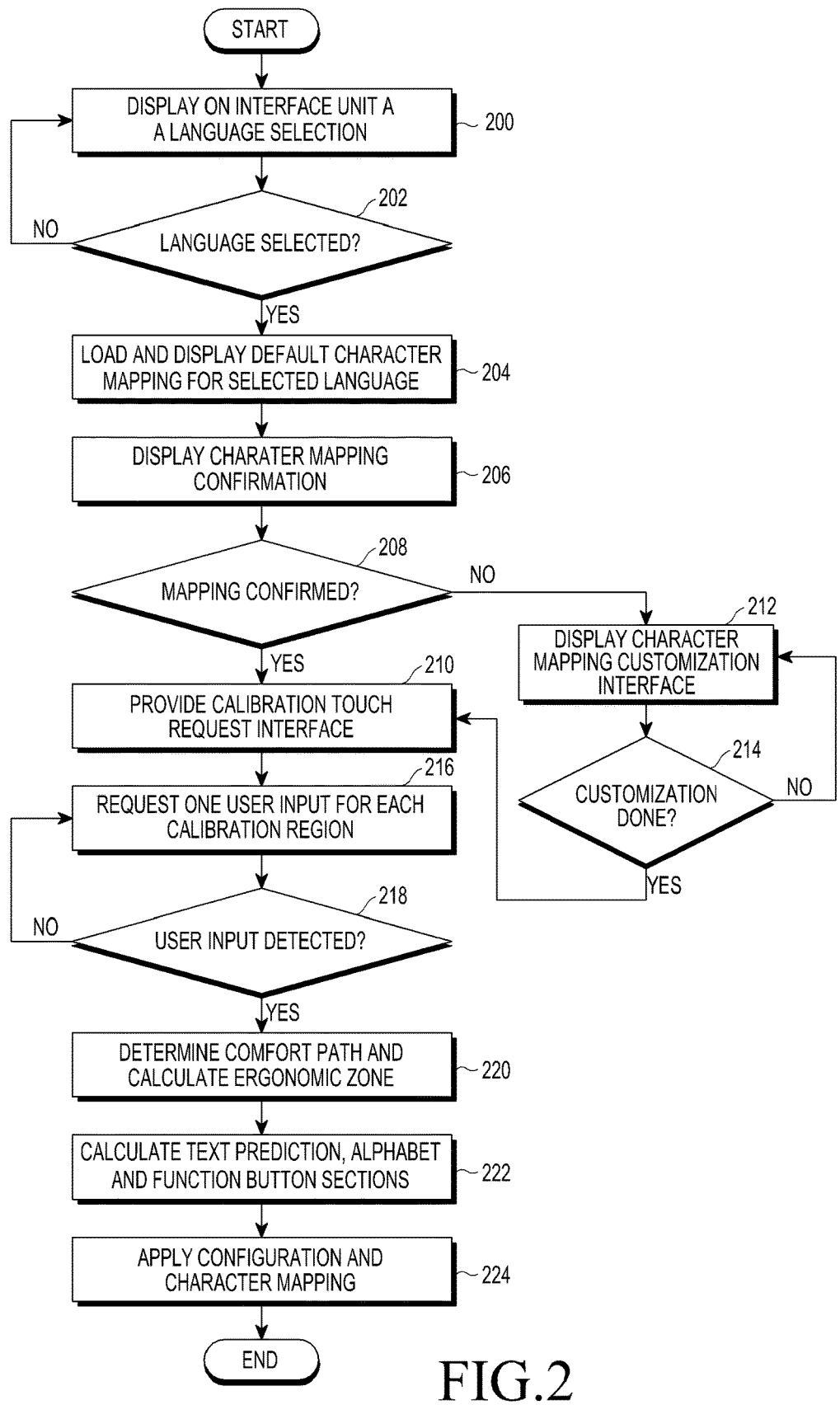
FIG. 2 is a flowchart of a process for preparing to calibrate a virtual keyboard according to an embodiment of the present disclosure.

FIG. 2 is a flowchart of a process for preparing to calibrate a virtual keyboard in the electronic device 100 according to an embodiment of the present disclosure.

Referring to FIG. 2, an initial setup procedure related to the virtual keyboard configuration is illustrated. In installing or initializing the software modules of the electronic device 100 in accordance with various embodiments of the present disclosure, the electronic device 100 may provide the user with a user interface screen to prompt the user to select whether to configure (or reconfigure) the virtual keyboard, or to use default settings of the virtual keyboard. If the user selects to configure the virtual keyboard, a setup module (not shown) associated with the configuration module 134 may be presented on the interface unit 104 of the electronic device 100. The setup module may provide an initial setup process for configuring the virtual keyboard and may be included and implemented in the configuration module 134 or implemented within a separate software module.

Referring to FIG. 2, the setup module displays language selection on a user interface screen through the interface unit 104 in operation 200. The setup module determines whether a particular language, e.g., Korean, English, Chinese, etc., is selected by the user through the interface unit 104 of the electronic device 100 in operation 202. In operation 202, the setup module provides a user interface screen for language selection according to a predetermined routine until a language selection input is received. Once the language selection input is received, the setup module proceeds to operation 204 to load the default character mapping. The setup module then displays the default character mapping for the selected language through the interface unit 104.

The setup module determines whether the character mapping has been confirmed in operations 206, 208, and then proceeds to operation 210 if the character mapping has been positively confirmed, or proceeds to operation 212 if the character mapping has not been confirmed. The setup module may provide a user interface screen to receive user confirmation about the character mapping through the interface unit 104. In the case of positive confirmation, in operation 210, the setup module communicates with the calibration module 132 and requests a calibration touch from the user through the interface unit 104. In the case of negative confirmation, in operation 212, the setup module provides the user with a customization interface for a character mapping through the interface unit 104. The customization interface may be provided for the user to modify the default character mapping to a different character mapping desired by the user or may be provided by displaying multiple selectable character mappings that can be selected by the user in operation 212. Once the customization is determined to completed in operation 214, the process proceeds to operation 210 to request the user's calibration touch for the virtual keyboard configuration. The customization interface for the character mapping may be provided through the setup module or the character mapping module 138. The user interface screen for the calibration touch is provided through the calibration module 132.

After the user interface screen is provided for the calibration touch in operation 210, the calibration module 132 requests at least one user input, i.e., a calibration point for each calibration region in operation 216. In one example, a single user input is requested for each calibration region for convenience of explanation. In operation 218, it is determined if the requested user input for each calibration region is detected by the calibration module 132. In response to the detection of the requested user input, the calibration module 132 determines (or calculates) an ergonomic comfort zone for virtual keyboard configuration in operation 220. A detailed method for configuring the ergonomic comfort zone will be described below with reference to FIG. 3. In operation 222, the calibration module 132 determines (or calculates) text prediction, alphabet, and function button sections of the keyboard region based on the determined ergonomic comfort zone. In operation 224, the determined configuration of the virtual keyboard is applied to the electronic device 100. It will be appreciated that the configuration of the virtual keyboard includes at least one of settings related to determination of the ergonomic comfort zone, layout and character mapping of the virtual keyboard, and calibration data related to the virtual keyboard. FIG. 2 is one example of and may further include other operations related to configuration of the virtual keyboard in addition to the aforementioned operations.

In relation to the virtual keyboard configuration, a procedure of configuring a calibrated virtual keyboard which is suitable for one-hand manipulation of the user will now be described in connection with FIGS. 3 to 22.

Figure 3:
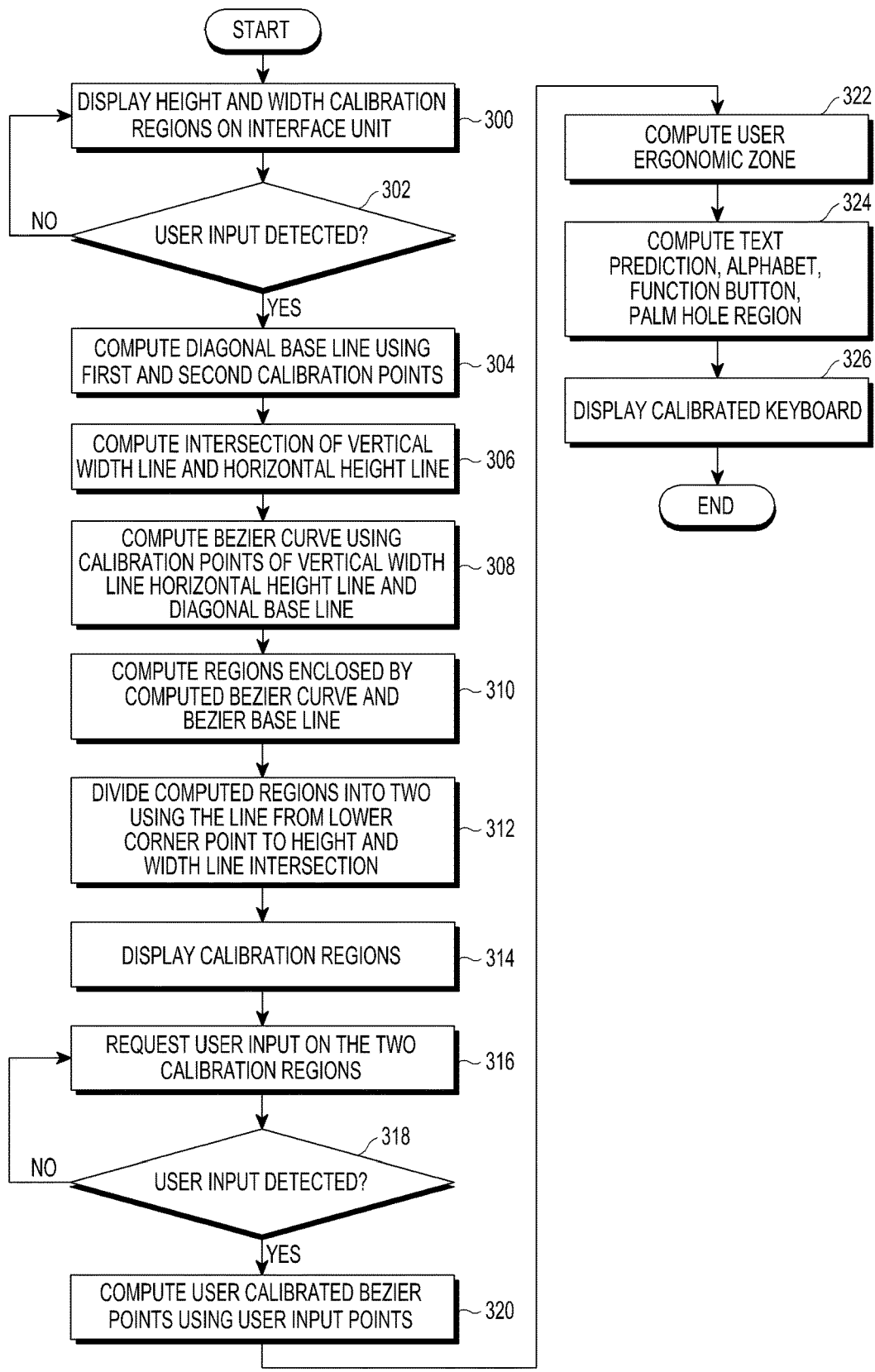
FIG. 3 is a flowchart of a method for calibrating a virtual keyboard according to an embodiment of the present disclosure.

FIG. 3 is a flowchart of a method for calibrating a virtual keyboard according to an embodiment of the present disclosure. FIGS. 4 to 22 are example screens for calibrating a virtual keyboard according to various embodiments of the present disclosure.

Referring to FIG. 3, the method may be performed by the keyboard module 124 including at least one of the calibration module 132, configuration module 134, text prediction module 136, character mapping module 138, and other keyboard modules 140 as described above with reference to FIG. 1. When the method is implemented, the inconvenience of repetitive arc calibration may be eliminated while configuring a virtual keyboard to support manipulation using a single hand. For this, the calibration module 132 controls the curvature of the virtual keyboard to a hand gesture of the user making touch actions against the virtual keyboard. The calibration module 132 is specifically arranged to calculate and recognize the ergonomic comfort zone in the keyboard configuration that is optimal for the user to input touch actions using one hand. Calibration of the left or right hand may be provided because each hand may have different natural movements and a different reach.

The calibration module 132 provides the calibration operation in two phases in relation to providing a calibrated keyboard configuration.

The first phase of the calibration operation relates to determining the most comfortable height and width of the virtual keyboard. The second phase of the calibration operation relates to determining the curvature of the ergonomic comfort zone.

Figure 4:
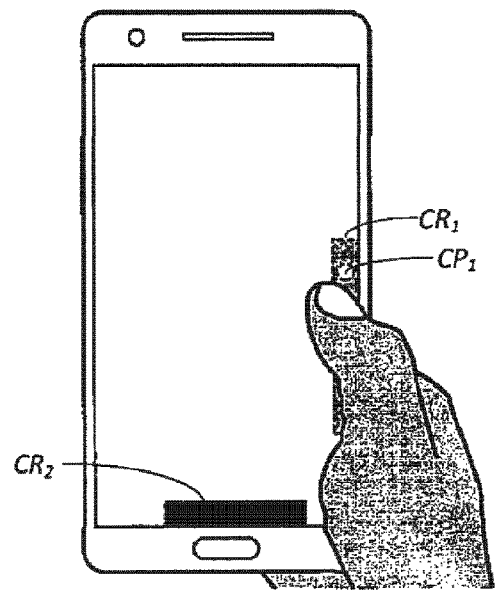
FIGS. 4 to 22 are example screens for calibrating a virtual keyboard according to various embodiments of the present disclosure.
Figure 5:
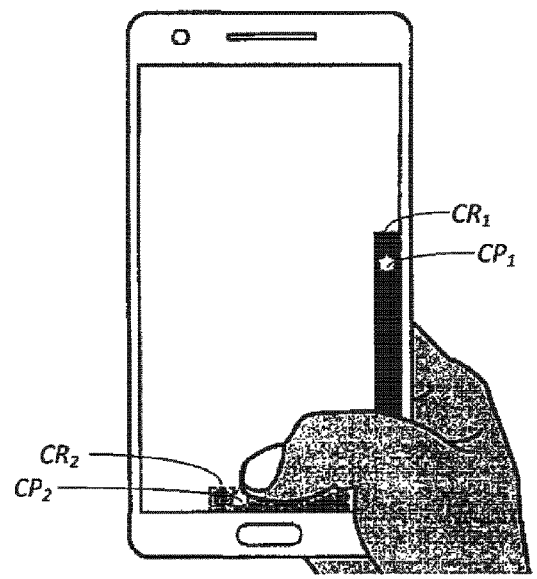
Figure 6:
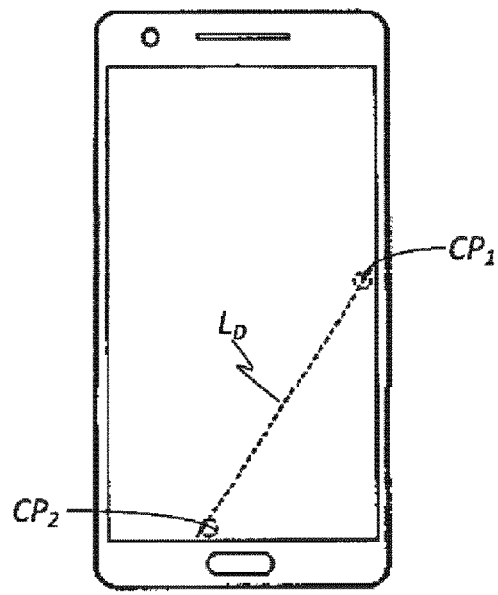

Prior to performing the first phase of the calibration operation, the calibration module 132 provides a user interface screen through the interface unit 104 of the electronic device 100 to prompt the user to select whether the virtual keyboard is to be manipulated by the left hand or the right hand. Once the user selects the left or right hand through the user interface screen, the calibration module 132 determines (or calculates) the height and width of the calibration regions for the virtual keyboard configuration. The height calibration region $CR_1$ may have minimum and maximum limits. Referring to FIGS. 4 and 5, in one example, the height calibration region $CR_1$ may be about 40% to about 70% of the screen display (i.e., display screen) height. On the other hand, the width calibration region $CR_2$ may have a range of about 50% to about 75% of the screen display width. The height and width calibration regions $CR_1$ and $CR_2$ may be placed near the sides of the display screen provided through the interface unit 104 of the electronic device 100.

Referring back to FIG. 3, the calibration module 132 obtains a first set of calibration points $CP_1$, $CP_2$ from the height and width calibration regions $CR_1$ and $CR_2$ through the first phase of the calibration operation. A calibration point $CP_1$ at a location of the user's thumb is obtained from the height calibration region $CR_1$, and a calibration point $CP_2$ at a location of the user's thumb is obtained from the width calibration region $CR_2$.

To determine the calibration points and the calibration regions, in operation 300, the calibration module 132 provides a prompt to plot the first calibration point $CP_1$ included in the first set of calibration points $CP_1$ and $CP_2$ within the first calibration region $CR_1$ included in the first set of calibration regions $CR_1$ and $CR_2$. Referring to FIG. 4, the first calibration point $CP_1$ is made to indicate the most comfortable keyboard height of the user's thumb4. The calibration module 132 then provides a prompt to plot the second calibration point $CP_2$ included in the second set of calibration points $CP_1$ and $CP_2$ within the second calibration region $CR_2$ included in the first set of calibration regions $CR_1$ and $CR_2$. Referring to FIG. 5, the second calibration point $CP_2$ is made to indicate the most comfortable keyboard width of the user's thumb.

Referring back to FIG. 3, in subsequent operation 302, the calibration module 132 determines whether user inputs for the first and second calibration points $CP_1$ and $CP_2$ are detected.

If no user input is detected for the first and second calibration points $CP_1$ and $CP_2$ in operation 302, operation 300 is repeated. Otherwise, if user inputs for the first and second calibration points $CP_1$ and $CP_2$ are detected in operation 302, the calibration module 132 calculates a diagonal base line ($L_D$) using the first calibration point $CP_1$ indicative of the comfortable height of the user's thumb and the second calibration point $CP_2$ indicative of the comfortable width of the user's thumb in operation 304. The diagonal base line $L_D$ may be calculated by obtaining a line that passes through both the first and second calibration points $CP_1$ and $CP_2$.

Figure 7:
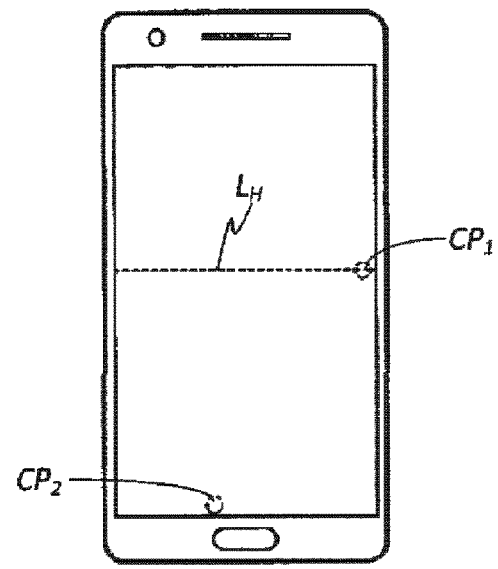
Figure 8:
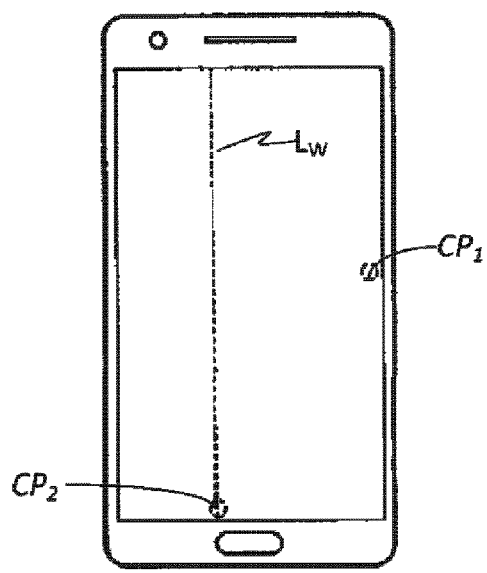

Referring to FIGS. 7 and 8, the calibration module 132 also computes a horizontal line $L_H$ derived from the first calibration point $CP_1$ and a vertical line $L_W$ derived from the second calibration point $CP_2$. The horizontal line $L_H$ may be computed by obtaining a horizontal line that passes through the first calibration point $CP_1$. The vertical line $L_W$ may be computed by obtaining a vertical line that passes through the second calibration point $CP_2$.

Figure 9:
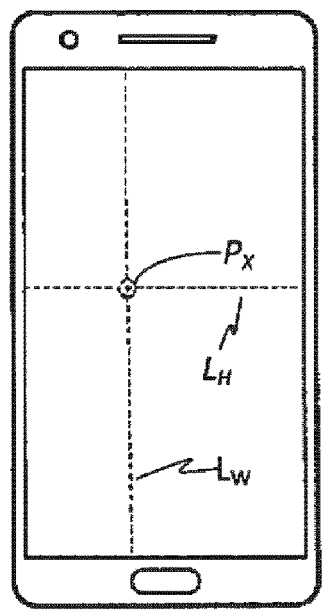
Figure 10:
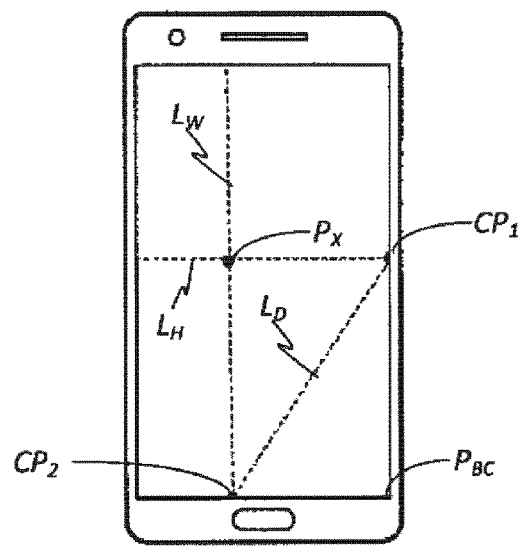

Referring back to FIG. 3, once the horizontal line $L_H$ and the vertical line $L_W$ are computed, the calibration module 132 computes an intersection point $P_X$ of the horizontal line $L_H$ and the vertical line $L_W$ in operation 306. Referring to FIGS. 9 and 10, the intersection point $P_X$ is illustrated and may be understood as a calibration point as well. The computed intersection point ($P_X$), first calibration point ($CP_1$), second calibration point ($CP_2$), and diagonal line ($L_D$) are required in computing a second set of calibration regions $CR_3$ and $CR_4$ including third and fourth calibration regions $CR_3$ and $CR_4$ in the subsequent calibration phase.

Figure 11:
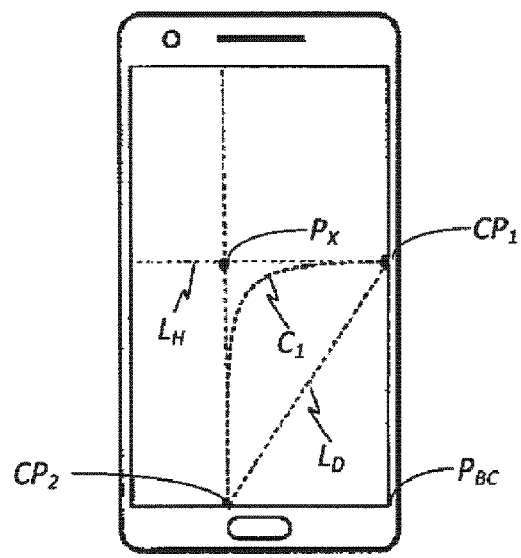

Referring back to FIG. 3, to determine the three calibration points $CP_1$, $CP_2$ and $P_X$, the calibration module 132 computes an initial cubic Bezier curve C1 in operation 308. Referring to FIG. 11, the initial Bezier curve $C_1$, which is a parametric curve commonly used in computer graphics and related fields, may be represented in the following Equation 1:

$$B(t)=(1-t)^3 P_0 + 3(1-t)^2 t P_1 + 3(1-t)t^2 P_2 + t^3 P_2, \text{ where } t \in [0,1]. \quad \text{Equation 1}$$

Applying points $P_H$, $P_W$ and $P_X$ to equation 1 leads to the following equation 2, where $P_H$ refers to the first calibration point $CP_1$ and $P_W$ refers to the second calibration point $CP_2$:

$$B(t)=(1-t)^3 P_W + 3(1-t)^2 t P_X + 3(1-t)t^2 P_X + t^3 P_H \text{ where } t \in [0,1]; \quad \text{Equation 2}$$

where intersection point $P_X$ serves as the two points of $P_1$ and $P_2$ in equation 1 required to compute the initial Bezier curve. Equation 2 provides the initial quadratic Bezier curve ($C_1$).

Figure 12:
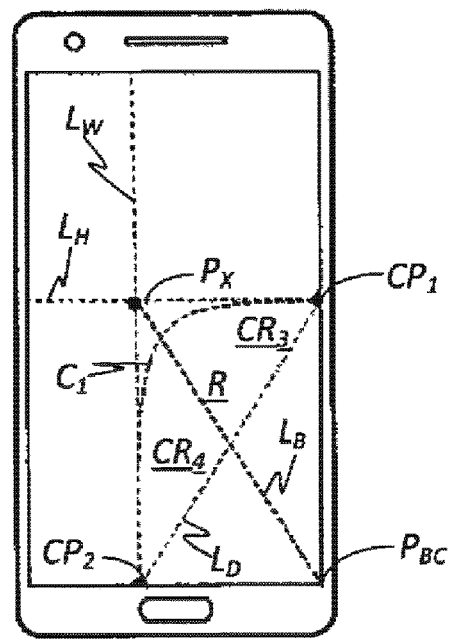
Figure 13:
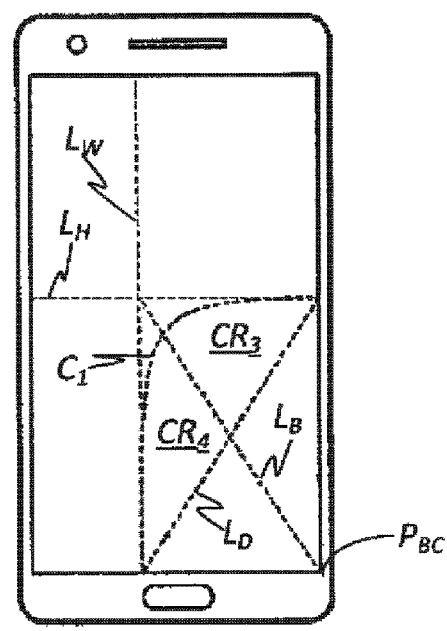
Figure 14:
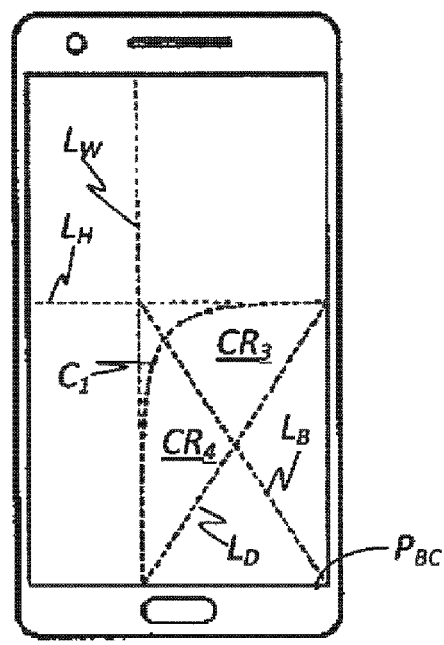

Referring back to FIG. 3, after obtaining the initial Bezier curve in operation 308, the calibration module 132 computes the second set of calibration regions $CR_3$ and $CR_4$ enclosed by the computed Bezier curve $C_1$ and a Bezier base line $L_B$ in operation 310. Referring to FIG. 12, the calibration module 132 computes the Bezier base line $L_B$ passing through the points $P_X$ and $P_{BC}$ and also a region R enclosed by the diagonal base line $L_D$ and the Bezier curve $C_1$. Referring back to FIG. 3, in operation 312, the calibration module 132 divides the region R into two parts using the Bezier base line $L_B$ as a dividing line and then displays the regions in operation 314. Referring to FIGS. 13, and 14, the regions derived from the two division parts and to specify an area for the second calibration phase.

Figure 15:
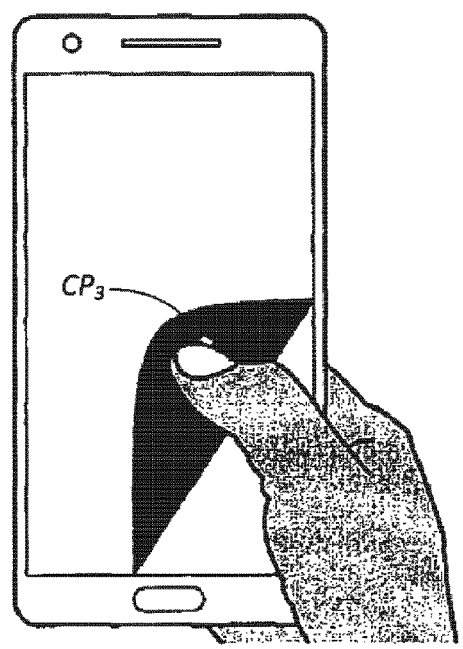
Figure 16:
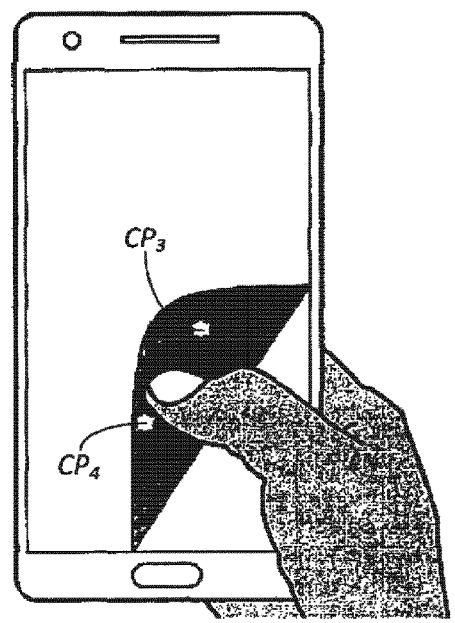

The second calibration phase may be carried out by the calibration module 132 and relates to determining the curvature of an ergonomic comfort zone. Referring back to FIG. 3, in operation 316, the calibration module 132 requests respective user inputs on the third and fourth calibration regions $CR_3$ and $CR_4$. The calibration module 132 prompts the user to touch one point on each of the two calibration regions $CR_3$ and $CR_4$. Referring to FIG. 15, once a touch input on the third calibration point $CP_3$ included in the second set of calibration points $CP_3$ and $CP_4$ is received, it may be represented in the third calibration region $CR_3$ included in the second set of calibration regions $CR_3$ and $CR_4$. Referring to FIG. 16, once a touch input on the fourth calibration point $CP_4$ included in the second set of calibration points $CP_3$ and $CP_4$ is received, it may be represented in the fourth calibration region $CR_4$ included in the second set of calibration regions $CR_3$ and $CR_4$.

Figure 17:
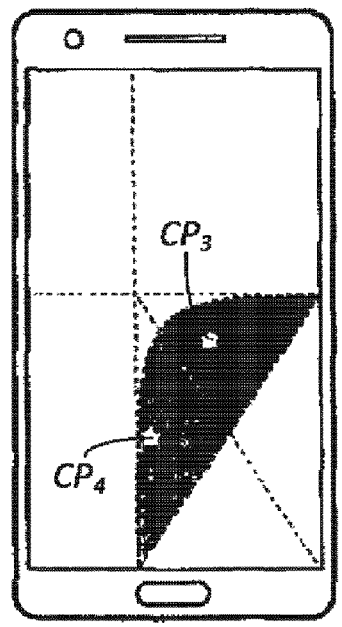
Figure 18:
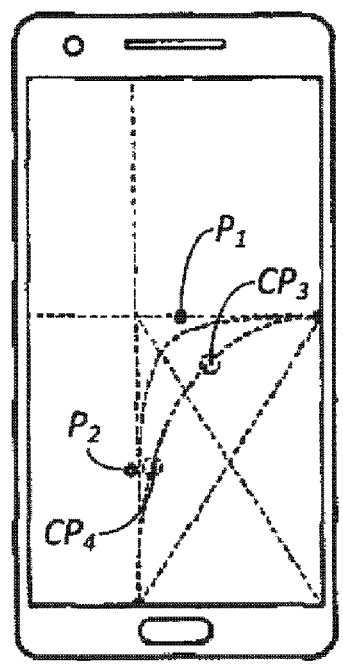

Referring back to FIG. 3, if the third and fourth calibration points $CP_3$ and $CP_4$ are detected in operation 318, the calibration module 132 computes calibrated control points $P_1$ and $P_2$, i.e., calibrated Bezier points characterized by Bezier points using the third and fourth calibration points $CP_3$ and $CP_4$ inputted by the user through the interface unit 104 of the electronic device, in operation 320. Referring to FIG. 17, the third and fourth calibration points $CP_3$ and $CP_4$ inputted by the user through the interface unit 104 of the electronic device are illustrated. Referring back to FIG. 18, the calibration module 132 may provide the user with a prompt instructing the user to readjust the control points $P_1$ and $P_2$ characterized by the initial Bezier curve to pass through the third and fourth calibration points $CP_3$ and $CP_4$. While two control points $P_1$ and $P_2$ are illustrated, there is no limitation on the number of the control points.

Figure 19:
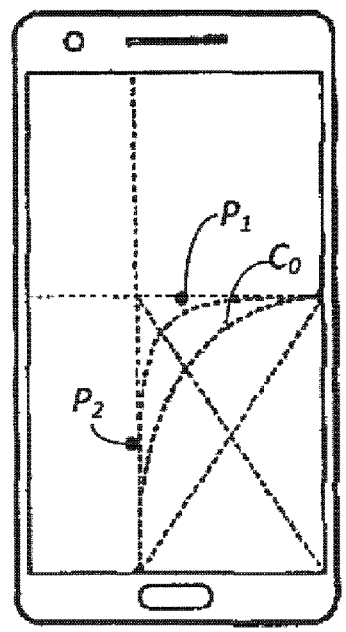
Figure 20:
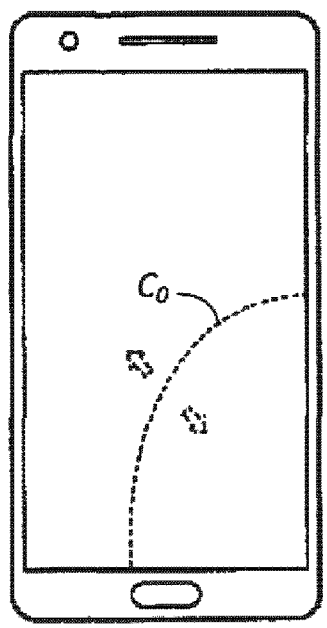
Figure 21:
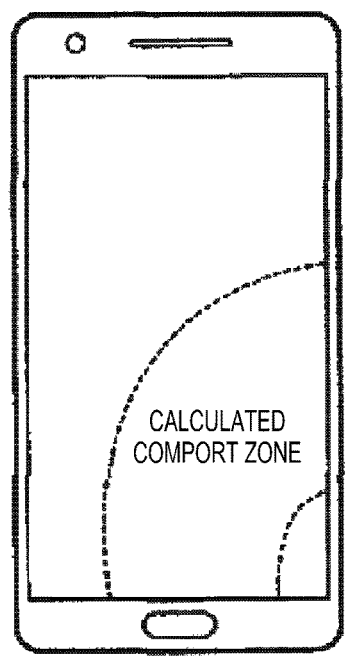

Referring to FIG. 19, the configuration of the virtual keyboard region relative to movement of the control points $P_1$, $P_2$ in the direction of the third and fourth calibration points $CP_3$ and $CP_4$ may be based on the final ergonomic Bezier curve marked as $C_0$. Referring back to FIG. 3, in the operation 322, the calibration module 132 computes the ergonomic comfort zone $C_0$ (or simply referred to as the "comfort zone"). Referring to FIG. 20, the comfort zone $C_0$ may be controlled by user input. Referring back to FIG. 3, after readjustment of the control points $P_1$, $P_2$ in the direction of the third and fourth calibration points $CP_3$, $CP_4$, the comfort zone, which indicates a comfortable gesture of the user's thumb, is computed in operation 322. Referring to FIG. 21, the comfort zone $C_0$ may include an upper curve limit ($C_{0U}$) of the comfort zone that has an offset of 5% wider than $C_0$ and a lower curve limit ($C_{0L}$) of the comfort zone that has an offset of 80% narrower than $C_0$.

Figure 22:
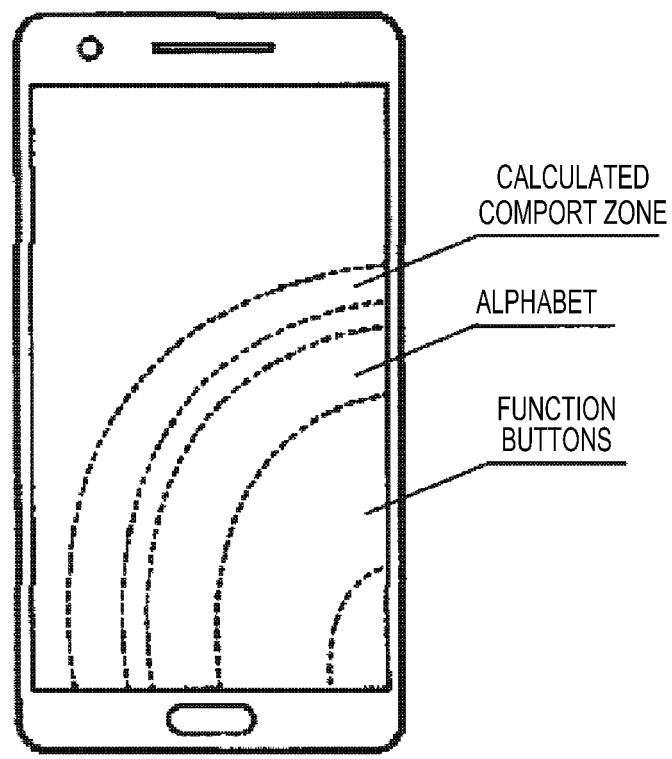

Referring back to FIG. 3, after computation of the comfort zone, the calibration module 132 computes sections of the keyboard configuration in operation 324. Referring to FIG. 22, the calibration module 132 computes text prediction region, an alphabet region, a function button region, and a palm hole (e.g., a palm rejection region). The upper limit of the text prediction section is 15% wider than $C_{0U}$ while its lower limit is 5% narrower. The upper limit of the alphabet section is same as the lower limit of the text prediction section while its lower limit is 40% narrower than $C_{0U}$. The upper limit of the function button section is same as the lower limit of the alphabet section while its lower limit is the same as the lower limit of $C_0$. The rest of the remaining section is allotted to the palm hole section. Referring back to FIG. 3, in operation 326, the calibration module 132 applies the calibrated virtual keyboard configuration based on the previous operations and displays all the buttons based on the computed sections. It should be noted that all ratio, percentages, or offsets mentioned in the sections are approximate and may vary depending on one or more implementations of the electronic device for providing a calibrated virtual keyboard configuration of the present disclosure.

The keyboard configuration provided by the electronic device in accordance with one or more embodiments of the present disclosure includes a text prediction section, an alphabet section, and a function button section. Aside from these three sections, there may also be a non-functional section that may be implemented in the keyboard configuration. The non-functional section may be referred to as the "palm hole section" located at the bottom corner of the keyboard configuration. The text prediction section may be disposed in close proximity to an outer portion of the keyboard region. Each of the alphabet and function button sections may be disposed in close proximity to an inner portion of the keyboard region.

The palm hole section rejects unnecessary touch input by the Thenar muscles or the part of the palm located at the base of the thumb. The Thenar muscles often cause unnecessary touch input during single handed manipulation. It is to be understood and appreciated that the calibrated keyboard configuration of the electronic device of the present disclosure may desirably be applied in portrait screen orientation of the electronic device, and that modifications to the components of the herein illustrated electronic device and how these components interact to one another in order to apply the calibration process of the present disclosure may be performed without substantial experimentation. In this regard, it should be readily apparent to a person skilled in the art that the calibrated keyboard configuration of the electronic device of the present disclosure may be applied in a different screen orientation of the electronic device.

The text prediction section is placed at the farthest or outer section of the soft keyboard because this section is the least used amongst the three functional sections. Each text suggestion is lined up horizontally along the outer part of the alphabet section. In case of text suggestion overflow, this section behaves like a roulette or a carousel view in order to view the overflowed text suggestions.

The alphabet section is placed near the most comfortable zone because it is the most frequently used section. The default character mappings in these sections are arranged in such a way that the most frequently used characters are set as primary characters and the less frequently used characters are mapped as secondary characters.

The function button section is placed near the palm hole because this section is the second most frequently used section.

In terms of character input method in respect of the calibrated keyboard configuration, one feature of the present disclosure is its ingenious method of character or function input. The character input method implements a press and swipe method which enables the keyboard to map one to nine actions or characters in a single button. The character input method is effective in optimizing layout space and, at the same time, making buttons larger to increase the input accuracy and to improve user experience in general. Such character input method is best implemented in the alphabet and the function buttons sections.

There may be some differences in the input method of the alphabet and function button sections; however, they may have similar implementation in general. The major difference in the implementation of the alphabet and function sections is that the alphabet section pops out a circular interface after detecting a press action from the user through the interface unit of the electronic device. The circular pop out displays the secondary characters sectored around the boundary of the pop out. A single press action inputs the primary mapped character, and a combination of press and swipe gestures towards a specific pop out sector inputs a secondary character. The pop out may be necessary because secondary character labels may appear small in the initial alphabet button appearance. Secondary character labels may be implemented to appear larger in the pop out sectors.

On the contrary, the function button section may be arranged differently, i.e., without the pop out implementation as compared with the alphabet section. Since buttons in the function button section are relatively larger, secondary character labels likewise have relatively larger fonts and there is no practical need for these buttons to be magnified through pop out sectors. Unlike the alphabet section, the function button section may also implement toggling actions on its buttons such as the uppercase toggling button. The function button section may also implement interchangeable primary function buttons which may quickly change to a specific primary functions after a long press action. An example of the primary function button is the settings button, which may quickly change into voice, handwriting, or clipboard button depending on user selection. All button input method may vary depending on the implementation of the present disclosure.

Other input methods than the press and swipe input method, such as clicking, gesture and continuous input may be implemented. Gesture inputs may trigger user profile switching and other functions. Continuous input method enables user to input words without releasing contact on touch sensitive screen characterizing the calibrated keyboard configuration of the electronic device of the present disclosure.

In terms of customization, the software modules of the electronic device of the present disclosure may include a settings and preferences user interface though which the user may modify specific configurations of the calibrated keyboard configuration. The settings and preferences user interface may include default and user defined presets, calibration options, language settings, text predictions, and user dictionaries. Further, the settings and preferences user interface may include options that are normally found in virtual soft keyboard of the related art.

The settings and preferences user interface may be accessed by long pressing the function button. There may be additional methods for accessing the settings and preferences user interface, but the user interface may also be accessed through other methods depending on the arrangement of software modules of the electronic device of the present disclosure. User defined settings and preferences may be backed up to a cloud server or an extensible markup language (xml) file. The backups may be restored or imported to prevent reconfiguration of the soft keyboard. The soft keyboard may also have a user profiling function where all settings and configurations may be saved and mapped to a specific user for multiple user support.

In terms of language support, the software modules of the electronic device of the present disclosure supports languages with non-complex alphabet system like the English language. Language support for complex languages may be suitably arranged in conjunction with the software modules depending on the implementation of the electronic device providing a calibrated keyboard configuration of the present disclosure.

In terms of character mapping, each button in the alphabet section may have a customized character mapping that may be effected by the user. This feature enables user to customize the character mappings to their own needs. Default keyboard mappings for the supported languages are optimally mapped according to the most frequently used characters to the least frequently used characters.

Modifying the preset character mappings in the electronic device may have enhancements. Various workflows of the character mapping module for modifying character mapping of a specific language may be implemented in the present disclosure. The workflows may vary depending on the implementation of the electronic device for providing a calibrated keyboard configuration of the present disclosure. First, the user may be prompted by a module for language selection.

The language selection module specifies the language default mappings and the alphabet characters to be mapped in the process. Next, the character mapping selection module is arranged to prompt the user on how many buttons should be displayed and mapped. The maximum and minimum number of buttons that may be laid out and mapped depends on the number of alphabets of the language and on the available size of the alphabet region. One button may contain one to nine alphabet characters.

Next, the character mapping module is arranged to prompt the user to choose a button to map characters to. Upon selection, the character mapping module prompts the user to enter the number of characters to be mapped on the selected button. A button may then be presented along with a pop-up. The character mapping module may then instruct the user to click a specific section of the presented button where he wants to map the character. The user may be required to repeat the process until the desired mapping is achieved.

Finally, once the desired mapping is performed, the character mapping module applies the mapping to the soft keyboard. It will prompt the user to enter a name for the custom character mapping which is necessary to save or back up the custom mapping.

It should be noted that the alphabet section may have its character mapping modified. The mapping of the function button section may not be modified. Some functions included in the function button section, but not limited to, are: left and right hand operation toggle, character case toggle, emoticon or smiley toggle, delete button, settings button, whitespace buttons, number pad, and common punctuation buttons. Some buttons as described above have quick switch functionalities where the user may switch a specific function, like the settings button, to another overflowed function, like the voice input and clipboard. When a long press action is done on these buttons with quick switch functionality, a pop up containing the overflowed functions is shown where the user may select a specific function to quickly switch to.

Another aspect of the present disclosure provides a machine-implemented method of controlling an electronic device having an interface unit. The method includes generating a first set of calibration regions on the interface unit and receiving a first set of calibration points within the first set of calibration regions. The method also includes generating on the interface unit an indication of the at least one relationship of calibration points included in the first set of calibration points, providing the indication with at least one control point movably disposed on the interface unit relative to the first set of calibration points, and generating on the interface unit a second set of calibration regions based on the provided indication.

Once the second set of calibration regions has been generated, a second set of calibration points within the second set of calibration regions is received and a graphical representation of the keyboard of a specified configuration based on disposition of the control point is generated, wherein the configuration of the keyboard region is adjustable relative to the movement of the control point in the direction of the second set of calibration points.

The aspects of the present disclosure described herein may provide the following non-exhaustive list of effects: (1) ergonomic one-handed operation (left hand/right hand when inserting text while messaging, searching, chatting, and the like; (2) decreased probability of dropping a touch screen device due to overreaching in order to reach buttons or icons when using them single handed; (3) enabling a user to experience one-hand operation so that only one-hand is used to manipulate the touch screen device and the other hand to do other tasks such as, for example, carrying a child, carrying a bag, cooking, holding an umbrella, and opening a door; and (4) reduced strain and wear and tear of hand ligaments caused by repeated use.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A portable electronic device for supporting a virtual keyboard of calibrated configuration which supports natural and comfortable movement of a human thumb, the electronic device comprising:
a display configured to obtain a touch input from a user's thumb and display the virtual keyboard; and
at least one processor configured to:
obtain a first touch point from the user's thumb touched at a right edge of the display and a second touch point touched from the user's thumb at a bottom edge of the display,
obtain an intersection point that a horizontal line derived from the first touch point and a vertical line derived from the second touch point are intersected,
determine a first cubic Bezier curve based on the first touch point, the second touch point and the intersection point,
determine a first region surrounded by the first cubic Bezier curve and a line connecting the first touch point and the second touch point,
obtain a third touch point and a fourth touch point from the user's thumb touched in the first region,
determine a second cubic Bezier curve connecting the third touch point and the fourth touch point, and
control the display to display the virtual keyboard within and fitted to a comfort zone bounded by the second cubic Bezier curve,
wherein the first region is bigger than a second region bounded by the second cubic Bezier curve and the line connecting the first touch point and the second touch point.

2. The electronic device of claim 1,
wherein the virtual keyboard includes a set of regions that includes a third region, and
wherein the third region includes a forth region which the first touch point is obtained and the fifth region which the second touch point is obtained.

3. The electronic device of claim 2,
wherein the set of regions of the virtual keyboard includes the first region, and
wherein the first region includes a sixth region which the third touch point is obtained and a seventh region which the fourth touch point is obtained.

4. The electronic device of claim 1,
wherein at least one control point is adjusted in a direction of the third touch point and the fourth touch point, and
wherein an initial position of the at least one control point is determined based on the first cubic Bezier curve.

5. The electronic device of claim 4, wherein the virtual keyboard is adjustable relative to the movement of the at least one control point along the first cubic Bezier curve in the direction of the third touch point and the fourth touch point.

6. The electronic device of claim 5, wherein the virtual keyboard is adjusted based on movement of the at least one control point with respect to the second cubic Bezier curve.

7. The electronic device of claim 1, further comprising:
a memory for storing at least one of a calibration module, a configuration module, a text prediction module, a character mapping module, or a language selection module.

8. The electronic device of claim 1, wherein the virtual keyboard includes at least one of a text prediction section, an alphabet section, a function button section, or a palm rejection section.

9. The electronic device of claim 8, wherein the text prediction section is disposed in close proximity to an outer circumference of the virtual keyboard.

10. The electronic device of claim 8, wherein the alphabet section and the function button section are disposed in close proximity to an inner portion of the virtual keyboard.

11. A method for displaying a virtual keyboard of calibrated configuration which supports natural and comfortable movement of a human thumb, in a portable electronic device, the method comprising:
obtaining a first touch point from a user's thumb touched at right edge of a display of the electronic device and a second touch point from the user's thumb touched at bottom edge of the display;
obtaining an intersection point that a horizontal line derived from the first touch point and a vertical line derived from the second touch point are intersected;
determining a first cubic Bezier curve based on the first touch point, the second touch point and the intersection point;
determining a first region surrounded by the first cubic Bezier curve and a line connecting the first touch point and the second touch point;
obtaining a third touch point and a fourth touch point from the user's thumb touched in the first region;
determining a second cubic Bezier curve connecting the third touch point and the fourth touch point; and
displaying the virtual keyboard on the display within and fitted to a comfort zone bounded by the second cubic Bezier curve,
wherein the first region is bigger than a second region bounded by the second cubic Bezier curve and the line connecting the first touch point and the second touch point.

12. The method of claim 11,
wherein at least one control point is adjusted in a direction of the third touch point and the fourth touch point, and
wherein an initial position of the at least one control point is determined based on the first cubic Bezier curve.

13. The method of claim 12, wherein the virtual keyboard is adjustable relative to the movement of the at least one control point along the first cubic Bezier curve in the direction of the third touch point and the fourth touch point.

14. The method of claim 13, wherein the virtual keyboard is adjusted based on movement of the at least one control point with respect to the second cubic Bezier curve.

15. The method of claim 11,
wherein the virtual keyboard includes a set of regions that includes the third region and the first region,
wherein the third region includes a forth region which the first touch point is obtained and the fifth region which the second touch point is obtained, and
wherein the first region includes a sixth region which the third touch point is obtained and a seventh region which the fourth touch point is obtained.

* * * * *